Patented June 5, 1923.

1,457,652

UNITED STATES PATENT OFFICE.

HANNS CARSTENS, OF LEVERKUSEN, AND CHRISTIAN HANSEN, OF WIESDORF, NEAR COLOGNE, GERMANY, ASSIGNORS TO FARBENFABRIKEN VORM. FRIEDR. BAYER AND CO., OF LEVERKUSEN, NEAR COLOGNE, GERMANY.

DISINFECTING, INSECTICIDAL, AND FUNGICIDAL COMPOSITION.

No Drawing.     Application filed August 8, 1921. Serial No. 490,713.

*To all whom it may concern:*

Be it known that we, HANNS CARSTENS and CHRISTIAN HANSEN, citizens of Germany, residing at, respectively, Leverkusen and Wiesdorf, near Cologne, Prussia, Germany, have invented new and useful Improvements in Disinfecting, Insecticidal, and Fungicidal Compositions (for which we have filed applications in Germany, June 21, 1920; France, April 16, 1921; England, February 25, 1921; Belgium, April 16, 1921; Italy, April 16, 1921; Holland, April 26, 1921; Austria, April 16, 1921; Hungary, April 21, 1921; Switzerland, April 19, 1921; Czechoslovakia, April 15, 1921), of which the following is a specification.

The so-called sulfid of lime liquor prepared by boiling milk of lime with sulfur is one of the most important bactericides for killing lower organisms, such as fungi and the like parasites on plants and the like. The sulfur in this liquor is not wholly effective as a great quantity of it is transformed in the liquor into the ineffective thiosulfate while the liquor can only be stored as a solution having about a strength of 30%.

According to this invention such compositions consist of a mixture of sulfur with a monosulfid of an alkali or alkaline earth metal, other than calcium sulfid, such as sodium- or barium-monosulfid. These mixtures possess the great advantage over the known sulfid of lime liquor in that being stable to air they can be brought into commerce as solid products. Before use they are stirred up with water.

These germicides are very effective even in very dilute solution for killing lower organisms on plants, such as fruit-trees, fruit-bushes, tomatoes, cucumbers, flowers, foliage-trees, coniferous-trees etc. which have been infected with diseases and noxious insects, such as mildew, mouldiness, rust, scurf, crust, plantlice, caterpillars, spiders, etc.

The preparations may for example be prepared in the following manner, the parts being by weight:

*Example A.*—100 parts of barium monosulfid are intimately mixed with 37 parts of sulfur. For use 1.5 parts of this mixture are dissolved in 100 parts of water, the solution being decanted or filtered from a precipitate. A solution ready for sprinkling plants is thus obtained, but solutions having a higher concentration may be employed.

*Example B.*—Sodium monosulfid is intimately mixed with about the same quantity of sulfur. 0.5 parts of this mixture are dissolved as in Example A in 100 parts of water and are then used in the same manner.

Or compositions containing a plurality of such sulfids may be employed.

We claim:—

1. Disinfecting, insecticidal and fungicidal compositions comprising a mixture containing sulfur and barium monosulfid.

2. Disinfecting, insecticidal and fungicidal compositions comprising a mixture containing sulfur and a plurality of monosulfids of the alkali and alkaline earth metals.

3. Disinfecting, insecticidal and fungicidal compositions comprising a mixture containing sulfur and a monosulfid of an alkali forming metal.

4. Disinfecting, insecticidal and fungicidal compositions comprising a mixture containing sulfur, sodium monosulfid, and barium monosulfid.

In testimony whereof we have hereunto set our hands in the presence of two subscribing witnesses.

HANNS CARSTENS.
CHRISTIAN HANSEN.

Witnesses:
  HANS BRÜCKNER,
  HERMANN HOHVEN.